US006776673B2

(12) United States Patent
Bellezza Quater et al.

(10) Patent No.: US 6,776,673 B2
(45) Date of Patent: Aug. 17, 2004

(54) AUXILIARY APPARATUS FOR FLOTATION, PROPULSION AND STEERING FOR WHEELED OR TRACKED VEHICLES

(75) Inventors: Giorgio Bellezza Quater, Lombardore (IT); Paolo Bellezza Quater, Maurizio Canavese (IT); Silvia Bellezza Quater, Maurizio Canavese (IT)

(73) Assignee: A.R.I.S. S.p.A., Lombardore (IT)

( * ) Notice: Subject to any disclaimer, the term of this patent is extended or adjusted under 35 U.S.C. 154(b) by 0 days.

(21) Appl. No.: 10/473,166

(22) PCT Filed: Jul. 30, 2002

(86) PCT No.: PCT/EP02/08486

§ 371 (c)(1),
(2), (4) Date: Sep. 29, 2003

(87) PCT Pub. No.: WO03/013884

PCT Pub. Date: Feb. 20, 2003

(65) Prior Publication Data

US 2004/0077233 A1 Apr. 22, 2004

(30) Foreign Application Priority Data

Aug. 9, 2001 (IT) .................................. TO200100139 U

(51) Int. Cl.⁷ ................................................. B60F 3/00
(52) U.S. Cl. .................................... 440/12.5; 440/12.51
(58) Field of Search ............................. 114/12.5–12.54, 114/123

(56) References Cited

U.S. PATENT DOCUMENTS

| 2,941,494 A | * | 6/1960 | McBride ....................... 440/97 |
| 6,116,972 A | * | 9/2000 | Bellezza Quater et al. ...... 440/12.51 |

FOREIGN PATENT DOCUMENTS

| EP | 0 872 366 | 10/1998 |
| EP | 1 000 778 | 5/2000 |
| GB | 1 069 235 | 5/1967 |

* cited by examiner

Primary Examiner—Ed Swinehart
(74) Attorney, Agent, or Firm—Guido Modiano; Albert Josif; Daniel O'Byrne

(57) ABSTRACT

An apparatus that can be bolted to the transom of a vehicle, comprising in combination a central box, which is open on at least the part of the surface that faces the transom of the vehicle and forms an extension for increasing the carrying volume and the buoyancy. Two lateral elements, for flotation and support of hydraulic propulsion motors with ducted propeller, are connected to the central box and contain respective fuel tanks and reservoirs for the motor actuation fluid, and there are ducts that end on the surface that faces the transom of the vehicle and are preset for the output, return and drainage connections of the motors.

11 Claims, 1 Drawing Sheet

US 6,776,673 B2

AUXILIARY APPARATUS FOR FLOTATION, PROPULSION AND STEERING FOR WHEELED OR TRACKED VEHICLES

BACKGROUND OF THE INVENTION

The present invention relates to an auxiliary apparatus for flotation, propulsion and steering for wheeled or tracked vehicles such as the M113 and the like.

A multipurpose vehicle, often applied for combat uses and essentially for troop transportation, has a watertight hull-like structure that makes it suitable for wading across watercourses by resting on the underlying pebbly bed and also gives it limited amphibious capabilities, which also make it suitable to cross small bodies of water and/or move on swampy terrain but always in calm and shallow water.

In order to be able to use this vehicle also in civil protection missions, for which the vehicle must be able to float and be highly maneuverable and have a high carrying capacity both in turbulent water, such as the water of a flood and overflow of a river, and on rough terrain, an amphibian vehicle has already been developed and is known; such vehicle is obtained by adding fore and aft flotation elements that are applied permanently to the chassis with watertight welds.

Although the modifications applied to the original vehicle make such amphibious vehicle particularly suitable for use in emergency conditions of the type described above, these modifications entail irreversible changes to the vehicle that increase its dimensions considerably, making the modified vehicle unsuitable for use for interventions in confined spaces or in which high maneuverability is otherwise required.

SUMMARY OF THE INVENTION

The aim of the present invention is to provide an auxiliary apparatus for flotation, propulsion and steering for wheeled or tracked vehicles that can be fitted/removed in the short times imposed by the occurrence of calamities.

Within this aim, an object of the invention is to fully utilize the volumes occupied by such apparatus by using at least part of it to obtain compartments suitable to supply the propulsion and steering means as well as additional loading volumes.

Another object of the invention is to provide such apparatus so that it has a low cost and is simple to manufacture.

This aim and these and other objects that will become better apparent hereinafter are achieved by the auxiliary apparatus for flotation, propulsion and steering for wheeled or tracked vehicles such as the M113 and the like having the characteristics given in claim 1, whereas the dependent claims define other advantageous characteristics.

BRIEF DESCRIPTION OF THE DRAWINGS

The invention is now described in greater detail and is illustrated only by way of non-limitative example in the accompanying drawings, wherein.

DESCRIPTION OF THE PREFERRED EMBODIMENTS

Figure 1:
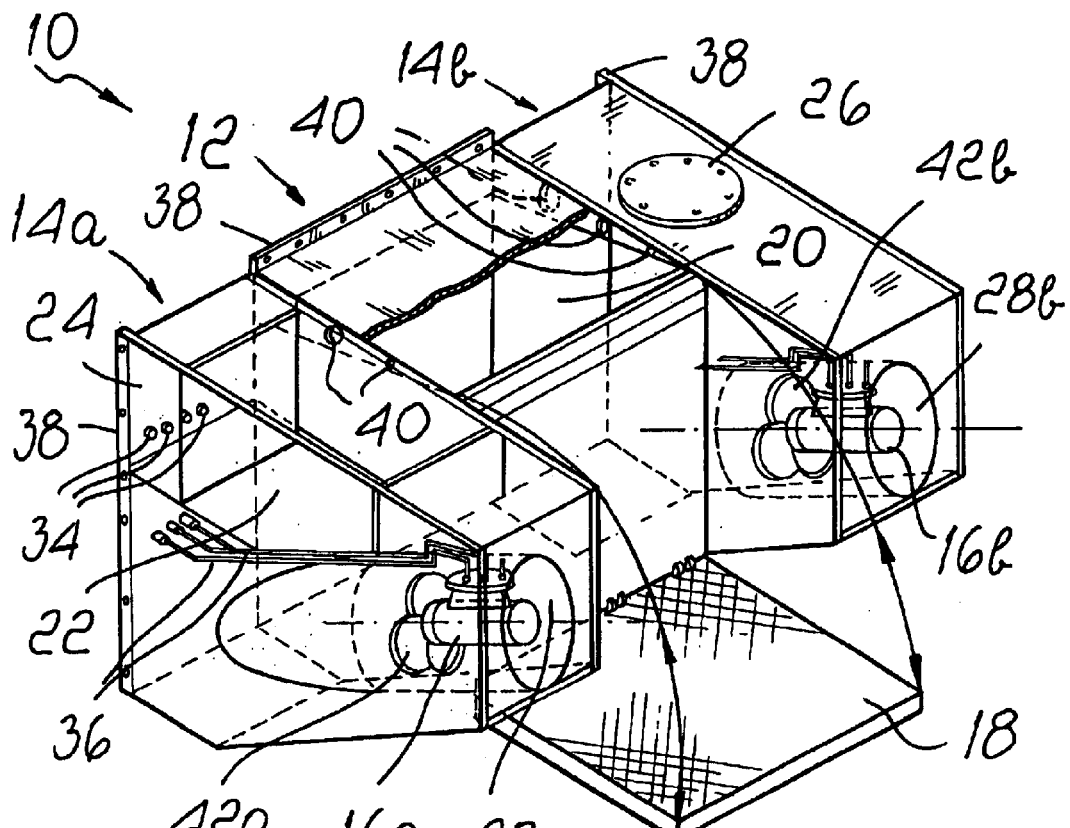
FIG. 1 is a partially sectional perspective view of the apparatus according to the invention with the door open.

With reference to the figures, the apparatus according to the invention, generally designated by the reference numeral 10 and suitable to be connected at the transom of the vehicle, comprises in combination a central box 12, which is open on at least part of the surface that faces the transom of the vehicle and forms an extension to increase the carrying volume and the buoyancy and is connected to two lateral elements 14a and 14b for flotation and for supporting the hydraulic propulsion motors 16a and 16b with ducted propeller; the apparatus can be connected to the vehicle by way of detachable connection means.

In this regard, the apparatus advantageously has perforated flaps 38 that extend from the corners that delimit the surface that faces the transom of the vehicle and provide a surface that is useful for bolting the apparatus to the vehicle.

Figure 2:
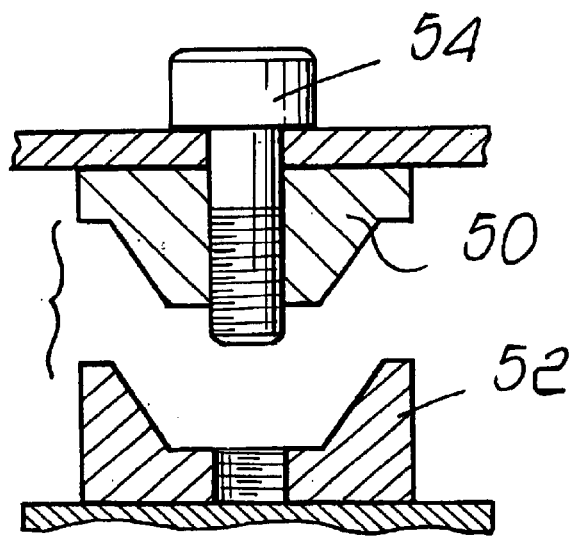
FIG. 2 is a sectional view of a detail of the coupling system with precision interfaces that can be mated by way of self-centering connections.

As an alternative, the apparatus can be welded or bolted (FIG. 2) with precision interfaces 50, 52 that can be mated by means of a self-centering threaded connection 54.

In any case, gasket elements are provided in the points of connection to the vehicle.

The apparatus advantageously includes at least one fuel tank 20, 22 and at least one reservoir 24 for the fluid that actuates the hydraulic motors, as well as the pipes 36 for the outgoing, incoming and drainage connections thereof, wherein such elements are arranged according to the preferred arrangement shown in the drawing and described hereinafter.

Hereinafter, bearing in mind that the elements that characterize the lateral element 14a are repeated substantially symmetrically, with respect to the longitudinal central vertical plane of the vehicle, on the element 14b, reference is made only to the first one of such elements, in order to simplify the drawings and the description; in any case, if there are differences they will be noted.

The central box 12 and, for a greater extent, the lateral elements 14a and 14b run longitudinally with a profile that tapers toward the end that lies opposite the end connected to the vehicle.

Advantageously, the central box 12 and each one of the lateral elements 14a and 14b includes respectively a central tank 20 and a lateral tank 22 that is adjacent thereto and is connected thereto by means of holes 40 for the fuel.

The tanks are arranged adjacent to the upper surface of the apparatus, and at least one of them has a connector 26 for introducing the fuel.

The tanks, when a predominantly amphibious use of the vehicle is expected, can replace completely the tanks arranged inside the vehicle, so as to reduce the risks related to the presence of flammable liquids in regions normally assigned to the transport of onboard personnel, injured people or otherwise people being rescued.

The box 12 is provided with a hermetic door 18 on the face that lies opposite the surface that faces the transom of the vehicle; items or people can be placed onboard through such door.

Preferably, each one of the lateral elements 14a and 14b includes a reservoir 24, which is also adjacent to the upper surface of the apparatus and in which the side wall that lies opposite the surface that faces the transom of the vehicle is in common with a lateral tank 22.

Accordingly, ports 34 are formed in the reservoirs for exchanging the hydraulic fluid between the motors 16a and 16b and their supply pumps, which are connected to the internal combustion engine of the basic vehicle, according to the principles of fluid dynamics that are well-known to the person, skilled in the art, and are not illustrated in the figures.

The same lateral elements are further provided with ducted seats 28a and 28b provided with hydrodynamic intakes, whose inlet is located on the outer lateral wall of said lateral elements; said seats are suitable to contain the hydraulic motors 16a and 16b and the propellers 42a and 42b connected thereto.

Moreover, ducts 36, provided for the input and output connections and for the drainage of the hydraulic motors, branch out from the hydraulic motors inside the lateral elements until they lead onto the surface that faces the rear profile of the vehicle, where they connect to the respective feed and discharge ducts.

The auxiliary apparatus according to the invention can be installed and removed rapidly, so as to allow immediate conversion of the vehicle according to the various requirements imposed by the various calamities for which intervention may be required.

Another advantage of the invention is that it allows to utilize the volumes of the bulk of the apparatus by utilizing at least a fraction thereof to form compartments that are useful for supplying the propulsion and steering means, as well as additional load volumes.

The possibility to place tanks and reservoirs externally with respect to the body of the base vehicle further allows to reduce the risks linked to the presence of flammable material on board, a condition that is particularly appreciated owing to use in the awkward conditions, which are per se already risky, for which said vehicle is intended.

Another advantage of the invention is that the apparatus can be produced by means of techniques and processes that are common in the field, so as to be overall low in cost and simple to manufacture.

In practice, the materials used, as well as the dimensions, may be any according to requirements.

The disclosures in Italian Utility Model Application No. TO2001U000139 from which this application claims priority are incorporated herein by reference.

What is claimed is:

1. An auxiliary apparatus for flotation, propulsion and steering for a wheeled or tracked vehicle, which can be connected at the transom of the vehicle, comprising in combination a central box, which is open on at least part of the surface that faces the transom of the vehicle, and forms an extension for increasing carrying volume and buoyancy, which is connected to two lateral elements for flotation and support of hydraulic propulsion motors with ducted propeller, said apparatus being connectable to said vehicle by means of detachable connection means.

2. The apparatus according to claim 1, comprising at least one fuel tank and at least one reservoir for the fluid for actuating said hydraulic motors, and wherein it further comprises ducts that lead onto a surface that faces the transom of the vehicle, said ducts being preset for the input, output and drainage connections of said hydraulic motors.

3. The apparatus according to claim 2, comprising three of said tanks, which are adjacent and connected by means of holes, a central tank being included in said central box and a lateral tank being included in each one of said lateral elements.

4. The apparatus according to claim 3, wherein said tanks are arranged adjacent to the upper surface of said apparatus.

5. The apparatus according to claim 2, comprising two of said reservoirs, included respectively in said lateral elements.

6. The apparatus according to claim 5, wherein said reservoirs are arranged adjacent to the upper surface of said apparatus and have a side wall that lies opposite the surface that faces the transom of the vehicle in common with said lateral tanks.

7. The apparatus according to claim 1, wherein said lateral elements have ducted seats provided with hydrodynamic intakes whose inlet is located on an outer lateral wall of said lateral elements, said seats being suitable to contain said hydraulic motors and the propellers connected thereto.

8. The apparatus according to claim 2, wherein said detachable connection means provide for perforated flaps that protrude from edges that delimit said surface that faces the transom of the vehicle, so as to provide a surface for the bolting of said apparatus to the vehicle, gasket elements being provided in points of connection to the vehicle.

9. The apparatus according to claim 1, wherein said detachable connection means provide precision interfaces that can be mated by way of a self-centering threaded connection with gasket elements provided in points of connection to the vehicle.

10. The apparatus according to claim 1, wherein said central box and, for a longer extent, said lateral elements are arranged longitudinally with a profile that tapers toward an end that lies opposite an end for connection to the vehicle.

11. The apparatus according to claim 2, wherein said central box has a hermetic door on a face that lies opposite a surface that faces the transom of the vehicle.

* * * * *